Sept. 5, 1967　　　　　　　　R. E. BADER　　　　　　3,339,804
PLURAL SOURCE FLUID METERING ASSEMBLY WITH
Filed Sept. 17, 1965　　　DISCHARGE ASSISTANT FOR EACH SOURCE
　　　　　　　　　　　　　　　　　　　　　　　4 Sheets-Sheet 4

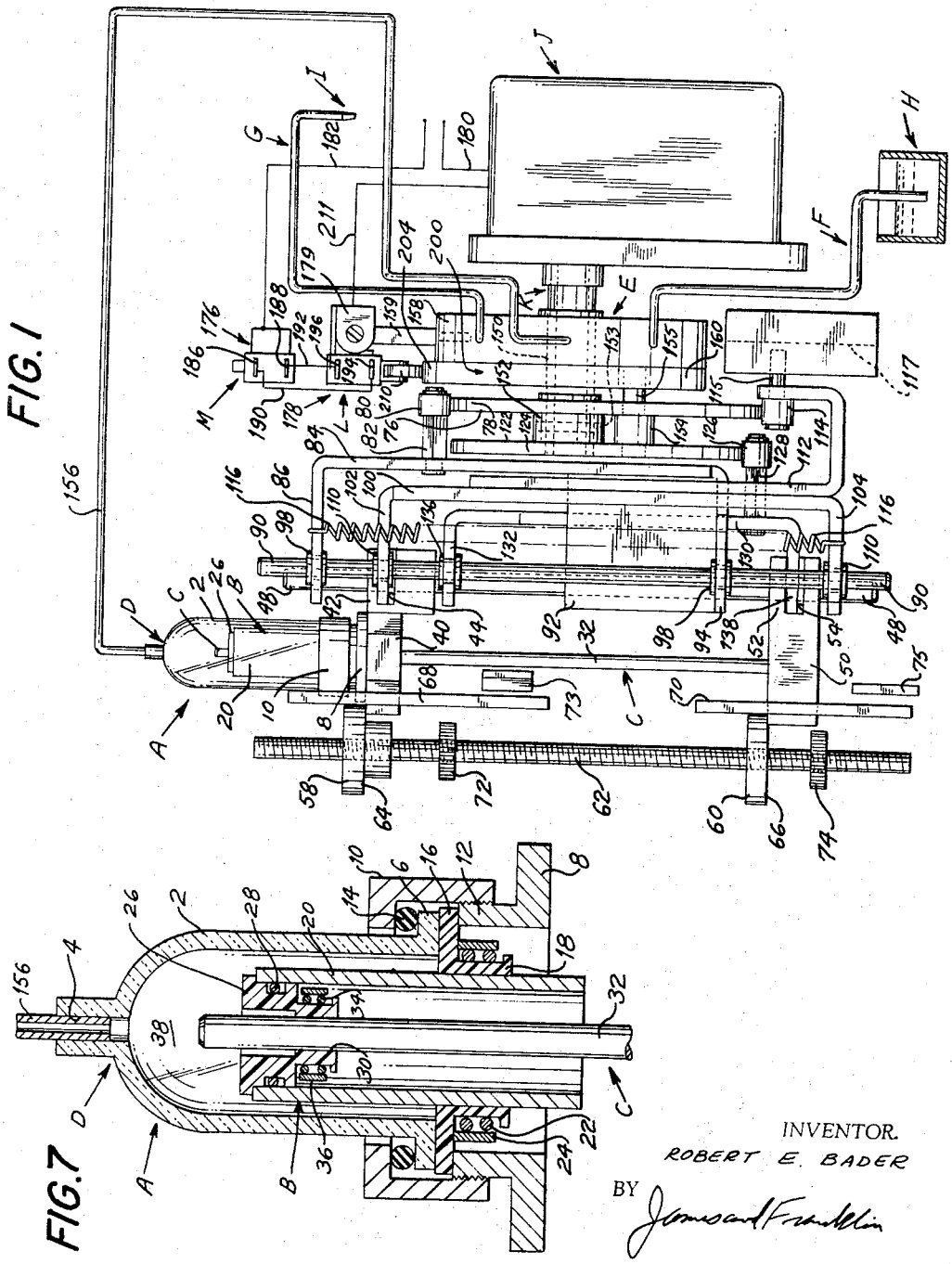

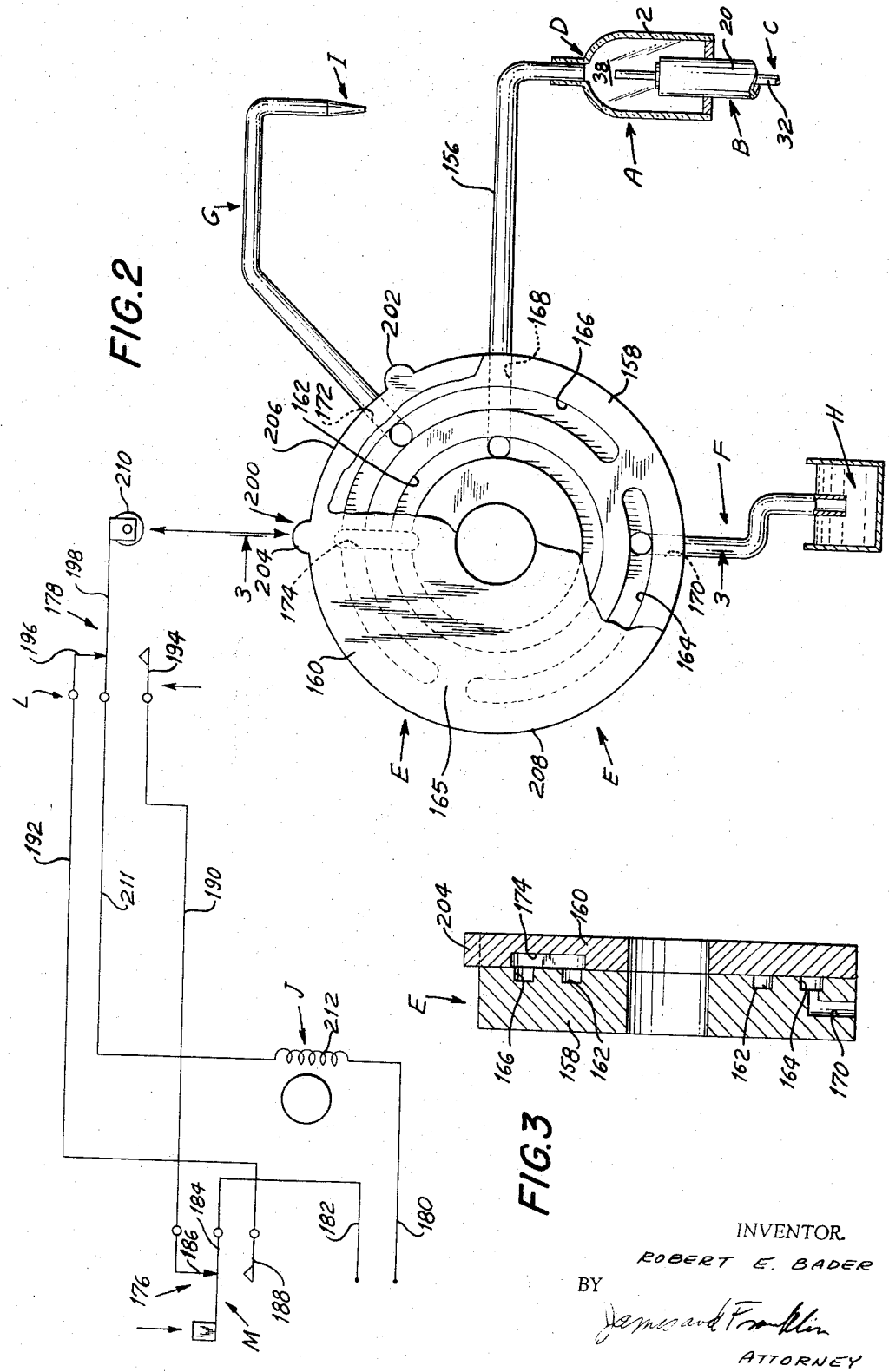

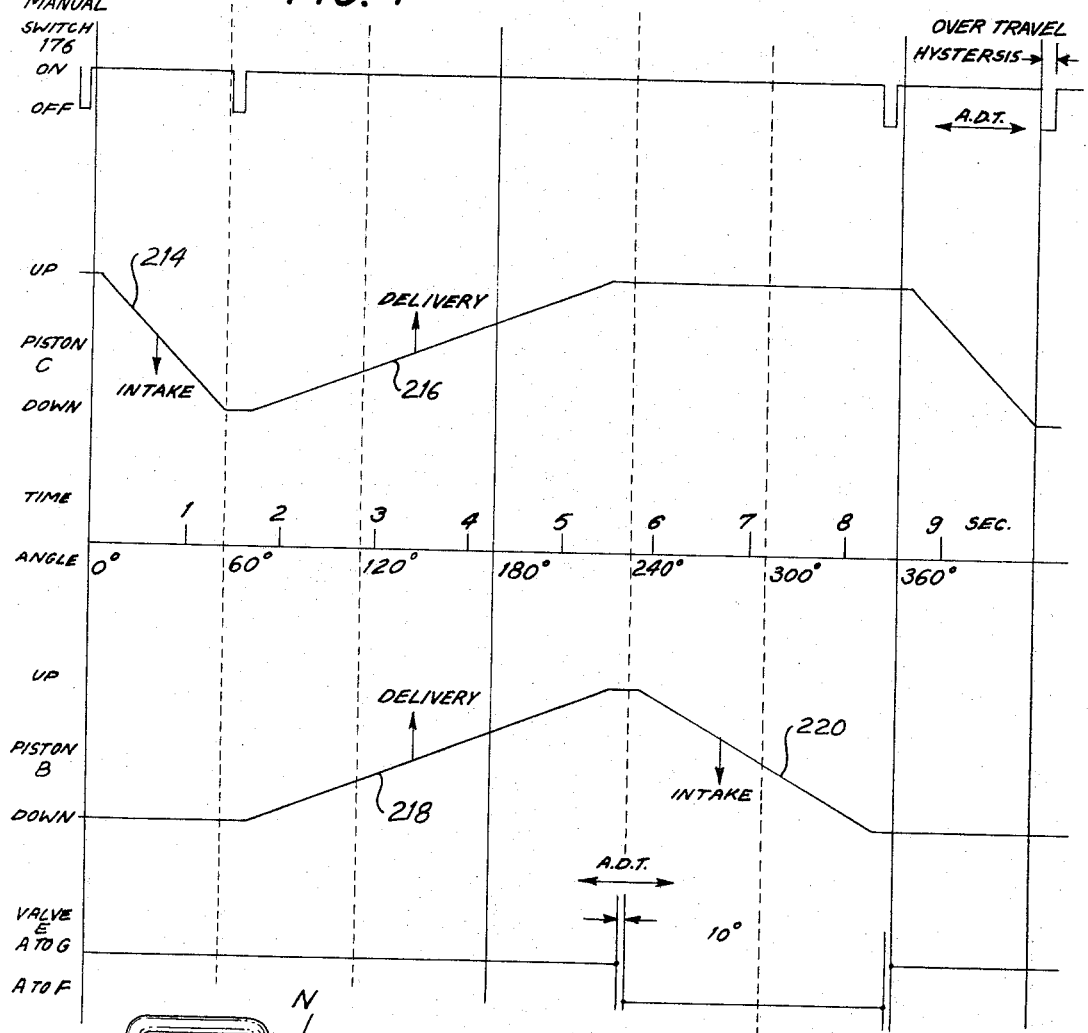

INVENTOR.
ROBERT E. BADER
BY
*James and Franklin*
ATTORNEY

United States Patent Office 3,339,804
Patented Sept. 5, 1967

3,339,804
PLURAL SOURCE FLUID METERING ASSEMBLY WITH DISCHARGE ASSISTANT FOR EACH SOURCE
Robert E. Bader, New York, N.Y., assignor to York Instrument Corp., New York, N.Y., a corporation of Delaware
Filed Sept. 17, 1965, Ser. No. 488,228
34 Claims. (Cl. 222—135)

ABSTRACT OF THE DISCLOSURE

A metering assembly having a single measuring chamber within which a plurality of pistons are movable under individual control, in combination with valving operatively connecting the measuring chamber to appropriate points in the system.

---

The present invention relates to a metering assembly, and more especially one designed to function with a high degree of accuracy, automatically or semi-automatically, to meter different quantities of substances which are to be mixed with one another.

The assembly of the present invention is particularly well adapted for preparing accurate dilutions of laboratory reagents or samples, that is to say, for taking an accurately measured volume of a sample and delivering that sample, together with an other measured volume of a second fluid such as a diluent, to a receiving vessel. The apparatus may also be adapted for more generalized reagent dispensing or volume-per-unit-time liquid metering. In the form specifically disclosed it is specially designed for two-fluid measuring operations in which the volume of one fluid is greatly in excess of the volume of the other, but in its more generalized aspects the system of the present invention is not thus limited.

Apparatus for carrying out such operations, as known in the past, has been essentially unsatisfactory, particularly where any appreciable degree of accuracy is required in the measurement of the fluids being handled. Yet it is precisely in such accuracy-demanding applications that the need is greatest for a reliable, flexible, and relatively inexpensive piece of laboratory equipment.

It is the prime object of the present invention to devise an apparatus capable of taking in extremely accurately measured quantities of fluids, and particularly of two different fluids used in widely varying amounts, and then dispensing said fluids, all in a highly reliable automatic or semi-automatic manner. Particularly is it the object of the present invention to devise such an apparatus which is capable of mixing small amounts of reagents or samples with large amounts of diluents, the amounts of reagent and diluent being very accurately controlled and being adjustable over wide limits so that the apparatus may be used to meet many different specifications.

The apparatus of the present invention is provided with a single measuring chamber which is used to measure and control the amounts of both of the substances (hereinafter termed "diluent" and "reagent" for purposes of explanation) which are taken into the system. As here specifically disclosed that chamber is provided with a pair of pistons, one radially inside the other and both extending into the chamber. Movement of the outer piston controls the amount of one of the substances (e.g., the diluent) which is taken into the system, and movement of the inner piston controls the amount of the other substance (e.g., the reagent) which is taken into the system. The pistons are moved independently, during separate intake stages, in order to bring the desired quantities of the two substances into the system. The two substances are selectively connected into the system by means of a valve the operation of which is coordinated with that of the pistons so that as each of the pistons is moved in its own intake stage, the system is connected to the appropriate substance to be drawn thereinto. The fact that the inner piston is smaller than the outer piston facilitates the use of the inner piston for controlling the intake for that substance (reagent) which is adapted to be used in smaller volume. To deliver the two substances from the system, both of the pistons are moved in a delivery state, the valve at that time connecting the system to a conduit which leads to the desired receptacle.

A single drive motor is provided which moves the pistons in appropriate timed relationship, the mechanical connection between the motor and the pistons being such as to permit the total travel of the pistons to be adjusted, thereby to permit control of the desired volumes of fluid to be measured and dispensed. The valve which controls the path of flow of fluid is also driven by the motor, preferably by means of a direct mechanical connection, thereby ensuring positive coordination and synchronization between the piston movements and the operative positions of the valve.

Also driven by the motor is a cam or other element which controls the movement of the motor, and particularly causes the motor to stop at appropriate points in the overall cycle of operation of the system. Thus, when the system is to be used to dilute a reagent, the system may be designed to take in a predetermined amount of diluent and then stop. The operator can then place a pipette or other inlet conduit into a supply of reagent, and, by pushing a button or the like, can start the motor, the system then drawing in a predetermined amount of reagent and then again automatically stopping. The operator can then transfer the pipette to a desired receptacle and, by again pushing the button, cause the motor to start, the system then delivering the predetermined volumes of diluent and reagent to that receptacle. Thereafter the valve can automatically shift from pipette to diluent supply, the system can without further supervision take in the desired amount of diluent, and then stop, ready to resume its described cycle of operation when the operator is ready.

When using a pipette, the fluid flow portion of which is quite restricted, and particularly when relatively large amounts of diluent are required relative to the amounts of reagent, a relief passage may be provided through which diluent may pass during the delivery stage of the system, while both diluent and reagent are expelled from the pipette. This permits the system to function more rapidly than would otherwise be the case, and also functions as a safety valve, preventing the building up of pressure within the fluid system in the event that the pipette should become wholly or partially clogged.

To the accomplishment of the above, and to such other objects as may hereinafter appear, the present invention relates to the construction and arrangement of a fluid metering assembly as defined in the appended claims and as described in this specification, taken together with the accompanying drawings, in which:

FIG. 1 is a front elevational view of a preferred embodiment of the present invention, the operative parts being shown in their assembled and connected positions, but with the support on which they are mounted being eliminated for purposes of clarity of illustration;

FIG. 2 is a schematic view of the electrical and fluid flow connections of the system, with the valve shown in a top plan view, partially broken away;

FIG. 3 is a cross sectional view of the valve, taken along the line 3—3 of FIG. 2;

FIG. 4 is a graphical representation of the operation of the various parts throughout the cycle of operation of the system;

FIG. 5 is a schematic view of a valve and associated fluid flow circuitry, representing an embodiment different from that shown in FIG. 2;

FIG. 6 is a three-quarter perspective exploded view of the various parts of the assembly other than the fixed supporting structure;

FIG. 7 is a vertical cross sectional view, on an enlarged scale, of the cylinder and pistons which make up the metering and measuring chamber; and FIG. 8 is a schematic diagram illustrating an alternative electrical control circuit.

General description

The system comprises a cylinder generally designated A within which a pair of pistons generally designated B and C are movable, thereby to define a metering and measuring chamber of variable volume. That chamber has an inlet D in fluid flow connection with a valve E which selectively conects the chamber inlet D to first and second supply tubes F and G respectively, the supply tube F being here disclosed as connected to a supply of diluent H and the supply tube G having a pipette tip I which is adapted to be inserted into a supply of reagent when reagent is to be drawn into the system and then to be moved to a suitable receptacle when the metered amounts of reagent and diluent are to be delivered by the system. A motor J is designed to drive the system, and its output shaft K actuates the valve E and also moves the pistons B and C, all in proper sequence. In addition it actuates a switch L which, in conjunction with a manual pushbutton M, acts to control the starting and stopping of the motor J in appropriate timed relationship.

Metering and measuring cylinder

The measuring chamber defined by the cylinder A and the pistons B and C is best shown in FIG. 7. It comprises a bell-shaped glass cylinder 2 having a narrow opening 4 at the upper end thereof defining the chamber inlet D, and having a flange 6 at the lower end thereof. The cylinder 2 is adapted to be mounted on a fixed base plate 8 by means of ring 10 threadedly received on the upstanding portion 12 of the base plate 8, a sealing ring 14 being compressed between the ring 10 and the flange 6. Interposed between the flanges 6 and the upwardly extending portion 12 of the base plate 8 is a sealing bushing 16 formed of Teflon or the like and having a collar portion 18 within which the piston B, defined by sleeve 20, sealingly slides, the collar portion 18 being sealingly urged against the sleeve 20 by means of O-ring 22 backed up by collar 24. A sealing bushing 26 of Teflon or similar material is mounted at and sealingly closes the upper end of the sleeve 20, a sealing ring 28 being compressed between the bushing 26 and the inner surface of the sleeve 20. The bushing 26 is provided with a central opening 30 through which the piston C sealingly slides, that piston being defined by a rod 32 of suitable, and preferably chemically inert, material. A proper seal between the rod 32 and the bushing 26 is ensured by means of O-ring 34 backed up by collar 36 which surround the narrow portion of the bushing 26 in which the opening 30 is provided. The metering and measuring chamber 38 is defined inside the cylinder 2, and its volume is determined by the positions of the pistons B and C. As those pistons move upwardly into the chamber 38 the volume of that chamber will decrease; as those pistons move out from the chamber 38 the volume of that chamber will increase. Because of the differences in diameter of the pistons B and C, a given linear movement of the piston B will have a much greater effect on the volume of the chamber 38 than will a corresponding movement of the piston C.

Piston moving means

The lower end of the sleeve 20 defining the piston B is secured to a block 40 having a laterally extending portion 42 which is horizontally slotted at 44 and which is provided with a vertical pasage 46. Fixed guide pin 48 is freely slidably received within the pasage 46. The lower end of the rod 32 defining the piston C is mounted in block 50, which also has a laterally extending portion 52 which is horizontally slotted at 54 and provided with a vertical passage 56 through which the guide pin 48 freely passes. Thus each of the blocks 40 and 50 is guided in vertical movement, but rotation thereof is prevented.

Fixedly mounted adjacent the blocks 40 and 50 are adjustable positive stops for limiting the degree of movement of the blocks 40 and 50, and hence of the pistons B and C respectively, in both directions. Nuts 58 and 60 are adjustably threadedly mounted on vertical fixed screw 62, the upper nut 58 defining a downwardly facing shoulder 64 which engages with the upper surface of the block 40, thereby constituting a positive stop for upward movement of the latter and the piston B. The lower nut 60 is provided with a shoulder 66 adapted to be engaged by the block 50, the nut 60 thereby constituting a positive stop for upward movement of the block 50, and with it the piston C. If desired, graduated scales 68 and 70 may be located adjacent the nuts 58 and 60 respectively, so that the positions of those nuts can be accurately adjusted, and lock nuts 72 and 74 may be provided for ensuring that the wheels 58 and 60 will remain in adjusted position. Fixed brackets 73 and 75 are located in the paths of movement of the blocks 40 and 50, respectively, and constitute positive stops for their downward movement.

For moving the block 40, and with it the piston B, a rotated cam 76 is employed having a cam surface 78 on the upper portion of which cam follower 80 rides. That cam follower 80 is connected by pin 82 to plate 84 having an upper flange 86 provided with apertures 88 through which fixed guide rods 90 freely extend, those guide rods thus constraining the plate 84 to vertical movement. The lower portion of the plate 84 is provided with a forwardly extending wall 92 having a lateral bottom extension 94 provided with an aperture 96 through which the right hand guide rod 90 freely passes. Bushings 98 may be provided to line the apertures 88 and 96.

Plate 100 is associated with plate 84. It is provided with upper and lower flanges 102 and 104 which have apertures 106 and 108 respectively, within which bushings 110 may be provided. The plate 100 is thus constrained to vertical movement along the guide rods 90, which pass through the bushed apertures 106 and 108. A bracket 112 is secured to the vertically extending portion of plate 100 and carries cam follower 114, which is adapted to engage the lower portion of cam surface 78. The cam follower 114 is mounted on pin 115 which is constrained to move vertically by sliding within fixed vertical groove 117. Extension spring 116 is stretched between flange 104 of plate 100 and flange 86 of plate 84, tending to draw plate 84 downwardly and plate 100 upwardly, thereby to cause the cam followers 80 and 114 respectively to engage the upper and lower portions of the cam surface 78. The flange 102 of plate 100 is provided with a notch 118, and that notched portion is adapted to be received, together with apertured cushioning plate 120, in the horizontal slot 44 of the plate 40, the fixed guide pin 48 passing through the aperture in the cushioning plate 120 and through the notch 118. Consequently, movement of the plate 100 will be translated into corresponding movement of the block 40 and hence of the piston B.

When the cam 76 is moving the plates 100 and 84 upwardly, and when in that movement the block 40 engages the shoulder 64 on the positive stop 58, further upward movement of the plate 100 and the cam follower 114 will be prevented. However, this will not impose any blocking strain on the mechanism, since further rotation of the cam 76 will lift the cam follower 80 and the plate 84, stretching the spring 116. As the cam 76 continues to rotate so as to cause the cam follower 80 and plate 84 to move downwardly, the cam follower 114 will ultimately be picked up by the cam 76 and then the two cam followers 114 and 80 will move downwardly together.

For moving the block 50, and with it the piston C, the cam 122 is employed, that cam having a cam surface 124. Engageable with the lower portion of cam surface 124 is cam follower 126, which is connected by pin 128 to plate 130. That plate has upper flanges 132 provided with apertures 134 within which bushings 136 may be received, and it is also provided with a lower flange 138 having an aperture 140 in registration with the aperture 134, within which aperture 140 bushing 142 may be received. The fixed guide rods 90 pass through the bushed apertures 134 and 140, thereby constraining plate 130 to vertical movement. Tension spring 144 is stretched between flange 138 on plate 130 and flange 86 on plate 84, thus constantly tending to draw the plate 130 upwardly, and thereby draw its cam follower 126 into engagement with the lower portion of the cam surface 124.

The flange 138 of plate 130 is notched at 146, and that notched portion is received, together with aperture cushioning plate 148, in horizontal slot 54 formed in the block 50, the fixed guide pin 48 passing through the aperture in the cushioning plate 148 and through the notched portion 146. Consequently movement of plate 130, as determined by the shape of cam 124, will give rise to corresponding movement of block 50 and piston C. When the block 50 moves upwardly into engagement with the shoulder 56 on the positive stop 60, further upward movement of the cam follower 126 will be prevented, but the cam 122 will be free to continue to rotate. Ultimately, as its cam surface 124 becomes operative to lower the piston C, that cam surface will pick up the cam follower 126 and move it downwardly.

For rotating the cams 76 and 122, and hence moving the pistons B and C, a motor J is provided, its output shaft K having extension 150 fixed thereto which carries hub 152 rotatively locked to the shaft extension 150 by pin 153. The cams 76 and 122 are rotatively fixed to hub 152, pin 154 extending through the cams 122 and 76 so as to lock them in desired relative rotational position and ensure that they rotate together, and with the shaft K.

*Fluid flow circuitry*

A tube 156 connects the inlet D of the chamber 38 to the valve E. That valve, as here specifically disclosed, comprises a fixed member 158, held in position by lugs 159, and a movable member 160. In the form shown in FIGS. 2, 3 and 6, the fixed member is provided with an inner 360-degree groove 162 and a pair of outer grooves 164 and 166 of appropriate arcuate extent. The inner groove 162 is connected in fluid flow relationship with the tube 156 by means of radial passage 168 which extends under and out of communication with the groove 166. The groove 164 is connected by radial passage 170 to supply tube F, while the groove 166 is connected by radial passage 172 to supply tube G which carries the pipette tip I. The movable member 160 of the valve E is mounted on the upper face of the stationary member 158 in sealing relation thereto and is provided on its inner surface with a radially extending groove 174 which extends between the inner groove 162 and one or the other of the outer grooves 164 and 166, depending upon the rotational position of the movable element 160, thereby defining a fluid communication between the inner grooves 162 and the appropriate outer groove 164 or 166. The movable valve member 160 is mounted on the motor shaft extension 150 so as to rotate therewith, as by being locked to the cams 76 and 122 by a protruding portion 155 of the pin 154. It will therefore be seen that when the groove 174 in the movable valve member 160 connects the grooves 162 and 166, as shown in FIG. 2, the chamber 38 of the metering cylinder A will be in fluid communication with the supply tube G, and when the groove 174 in the movable valve member 160 connects the grooves 162 and 164, as when the movable valve member 160 is rotated 180 degrees from its position shown in FIG. 2, the metering chamber 38 of the cylinder A will be in fluid communication with the supply tube F.

FIG. 5 discloses a variant in the fluid system which involves the use of a relief tube N in addition to the supply tubes F and G, the relief tube N being connected by radial passage 222 in the fixed valve member 158 to an arcuate groove 224 which is located radially between the grooves 162 and 166 but extends only over that arcuate portion of the groove 166 which corresponds to the delivery stage of the system or some predetermined portion thereof. The purpose of the relief tube N is to facilitate the discharge of large volumes of fluid at a relatively rapid rate, particularly when pipettes I are employed, since the restricted nature of such pipettes limits the rate of fluid flow and thus tends to cause pressure to build within the fluid system while the pistons B and C are forced up into the chamber 38. Moreover, in the event that the pipette tip I should become wholly or partially clogged, the relief tube N will permit the fluid system to be vented without causing any damage. The end of the relief tube N may be located adjacent to, and be manipulatable with, the pipette tip I, thereby ensuring that the proper amount of diluent as well as the proper amount of reagent are dispensed. In this connection it will be appreciated that it is often the case that the amount of reagent metered at any one cycle is so small that it never goes beyond the supply tube G, the remainder of the system constantly being filled with diluent, with diluent washing out the supply tube G and the pipette tip I during each discharge step.

*Motor control circuit*

The electrical circuit for the motor J is shown in FIG. 2. That circuit comprises a manually operated switch 176 (M) fixedly mounted in any appropriate location and an automatically operated switch 178 (1) which is adjustably mounted on fixed bracket 179 which is in turn secured to lug 159. Leads 180 and 182 are connected to any appropriate source of power. Lead 182 extends to central terminal 184 of the switch 176, which terminal is normally in engagement with upper terminal 186. When the switch 176 is actuated, however, the terminal 184 is disengaged from terminal 186 and moved into engagement with terminal 188. Terminals 186 and 188 are connected, by leads 190 and 192 respectively, to the lower and upper terminals 194 and 196 respectively of the switch 178. The central terminal 198 of the switch 178 is adapted to be engaged either with the terminal 196 or the terminal 194, depending upon the action thereon of a cam surface 200 which may be defined by the outer surface of the movable valve member 160, that cam surface 200 having a pair of appropriate circumferentially spaced raised portions 202 and 204 separated by depressed portions 206 and 208. The central terminal 198 of switch 178 is provided with a cam follower 210 which engages with the cam surface 200, contact being made between terminals 198 and 194 when the cam follower 210 rides on the depressed cam surfaces 206 and 208, and contact being made between terminals 198 and 196 when the cam follower 210 rides on the raised cam surfaces 202 and 204. Lead 211 connects terminal 198 with one end of the motor field 212, the other end of the field 212 being connected to lead 180.

Thus, in the situation shown in FIG. 2, with the cam follower 210 in engagement with the raised cam surface 204, and with the manual switch 176 unactuated, the circuit to the motor field 212 is open and the motor is at a standstill. To start the motor the switch 176 is depressed, a circuit then being completed through switch terminals 184 and 188 and switch terminals 196 and 198, causing the motor to start. As the movable valve member 160, and with it the cam surface 200, rotates, the cam follower 210 rides down onto the lower cam surface 208, the circuit through the motor field 212 then being completed through switch terminals 194 and 198 and the unactuated manual switch 176. Hence the motor will continue to operate when the manual switch is released, and until the cam follower 210 rides up on one of the raised cam surfaces 202, at which time the circuit through the motor field 212 will be broken and the motor will once again stop.

In the circuit disclosed in FIG. 2, when the cam follower 210 rides off from the raised cam portion 204, thereby separating the terminals 196 and 198 and engaging the terminals 194 and 198, energization of the motor J will be interrupted until the manual switch 176 is released, permitting reengagement of the terminals 184 and 186. The alternative circuit arrangement shown in FIG. 8, in which the manual switch 176 is connected directly in parallel with the cam actuated switch 178, makes it unnecessary to release the manual switch 176 in order for the motor J to continue to be energized. However, in the circuit of FIG. 8 it is necessary to release the manual switch 176 while the depressed cam surface 206 or 208 is operative if the motor J is to be de-energized at the proper point.

*Cycle of operation*

FIG. 4 illustrates in schematic form the operation of the above described apparatus over a typical cycle of operation. FIG. 4 assumes as a starting condition a situation in which the piston B has been moved down in the cylinder A a distance such as to suck into the chamber 38 a predetermined amount of diluent H, the valve E at this point having the groove 174 located at the blank space 165 between the grooves 164 and 166 on the left hand side of FIG. 2, the raised cam surface 202 being in engagement with the cam follower 210, the motor thus being stopped.

With the system thus full of diluent, the operator will, for a typical mode of operation of the device, immerse the pipette tip I in a supply of reagent and then actuate the switch 176 to cause the motor J to start. This will cause the movable valve member 160 to rotate in a clockwise direction as viewed in FIG. 2, causing the groove 174 to connect the grooves 162 and 166 and thus putting the chamber 38 in fluid communication with the pipette tip I. At the same time the cam 122 will cause the piston C to move downwardly, thus drawing fluid into the system in a volume determined by the amount that the piston C moves out from the chamber 38, thereby sucking that predetermined amount of reagent into the pipette tip I and the supply tube G. This intake stroke is represented, on FIG. 4, by the curve portion 214. The amount of fluid thus sucked into the system will not be determined exclusively by the cam 122, but will also be determined by the setting of the positive stop 60, which had previously limited the degree to which the piston C had moved inwardly into the chamber 38. At the end of this intake stroke the raised cam surface 204 will engage the cam follower 210 and stop the motor J, this being the position illustrated in FIG. 2.

The operator will then remove the pipette I from the reagent supply and transfer it to the place where the mixture of reagent and diluent is wanted. He will then again actuate the switch 176, the motor J will start, and the pistons B and C will be moved into the chamber 38 by the cams 76 and 122 respectively, thereby delivering fluid through the tube G and the pipette tip I, the volume of fluid thus expelled corresponding to the degree to which the pistons B and C move into the cylinder A, which will in turn be controlled by the setting of the positive stops 58 and 60. This delivery stage is represented in FIG. 4 by the portions 216 and 218 of the curves for the pistons B and C respectively.

During the time that this delivery stage is taking place the movable member 160 of the valve E is rotating. At first the groove 174 continues to span the grooves 162 and 166. Eventually the groove 174 reaches the end of the groove 166, a rotation of approximately one hundred fifty degrees as viewed in FIG. 2, and it then moves on to connect the grooves 162 and 164, thereby placing the diluent supply H and the supply tube F in fluid communication with the chamber 38. At this point the cam 76 will cause the piston B to move downwardly while the piston C remains stationary, thereby sucking an amount of diluent into the system which corresponds to the distance that the piston B moves downwardly from its extreme upper position as limited by the positive stop 58. This diluent intake stroke is represented on FIG. 4 by the curve portion 220. When this operation is finished the raised cam portion 202 engages cam follower 210 and stops the motor J. The operator can then move the pipette tip I to the reagent supply, actuate the switch 176 and start the cycle again.

While the apparatus of the present invention has been here specifically disclosed for use in conjunction with laboratory mixing of reagent and diluent in controlled steps in a semi-automatic manner, it will be understood that the apparatus could easily be adapted, by suitable and obvious modification particularly of the fluid flow system and valving, to provide for continuous measuring of a plurality of components followed by the dispensing of those components. Moreover, the pistons active in the cylinder A could be differently arranged, separating from opposite ends, from different sides, or side by side; the relative movement of the pipette and the receptacle could be reversed, the pipette being stationary and different receptacles being moved to it; the cam control could be accomplished by a reversal of raised and lowered surfaces; many other variations may be made therein, all within the spirit of the invention as defined in the following claims.

I claim:

1. A metering assembly comprising a cylinder having side walls defining a chamber and having an inlet to said chamber, a first piston movable in directions into and out from said chamber, a second piston movable through said first piston in directions into and out from said chamber, means for sealing said first piston relative to said cylinder and sealing said second piston relative to said first piston, a valve means in fluid communication with said inlet, means connecting said valve means to first and second supply tubes respectively, said valve means connecting said inlet to said first and second supply tubes respectively in accordance with a predetermined schedule, and means for moving said first and second pistons respectively in accordance with a predetermined schedule.

2. The metering assembly of claim 1, in which said first piston is radially spaced from said side walls of said cylinder and said means for sealing said first piston to said cylinder is located at an end of said cylinder and is radially inwardly spaced from said cylinder side walls.

3. In the metering assembly of claim 1, a relief conduit connected to said valve means, said valve means operatively connecting said relief conduit to said inlet when said second supply tube is also connected to said inlet and when one of said pistons is at the same time being moved in a direction into said chamber.

4. A metering assembly comprising a cylinder having side walls defining a chamber and having an inlet to said chamber, a first piston movable in directions into and out from said chamber, a second piston movable through said first piston in directions into and out from said chamber, means for sealing said first piston relative to said cylinder and sealing said second piston relative to said first person, a valve means in fluid communication with said inlet, means connecting said valve means to first and second supply tubes respectively, said valve means connecting said inlet to said first and second supply tubes respectively in accordance with a predetermined schedule, and means for moving said first and second pistons respectively in accordance with a predetermined schedule, said valve means connecting said inlet to said first supply tube when said first piston is being moved in a direction out from said chamber and connecting said inlet to said second supply tube when said second piston is being moved in a direction out from said chamber.

5. The metering assembly of claim 4, in which said first piston is radially spaced from said side walls of said cylinder and said means for sealing said first piston to said cylinder is located at an end of said cylinder and is radially inwardly spaced from said cylinder side walls.

6. In the metering assembly of claim 4, actuating means including a control means, said actuating means being operatively connected to said valve means and to said piston moving means, said actuating means being effective (a) when said control means is first actuated in a given sequence, to cause said inlet to be connected to said first supply tube and to cause said first piston to move in a direction out from said chamber, and then stop, (b) when said control means is next actuated in said sequence, to cause said inlet to be connected to said second supply tube and to cause said second piston to move in a direction out from said chamber, (c) said actuating means thereafter causing both of said pistons to move in a direction into said chamber while causing said inlet means to be connected to said second supply tube.

7. In the metering assembly of claim 6, a relief conduit connected to said valve means, said valve means operatively connecting said relief conduit to said inlet when said second supply tube is also connected to said inlet and when one of said pistons is at the same time being moved in a direction into said chamber.

8. In the metering assembly of claim 4, a relief conduit connected to said valve means, said valve means operatively connecting said relief conduit to said inlet when said second supply tube is also connected to said inlet and when one of said pistons is at the same time being moved in a direction into said chamber.

9. A metering assembly comprising a cylinder having side walls defining a chamber and having an inlet to said chamber, a first piston movable in directions into and out from said chamber, a second piston movable through said first piston in diretcions into and out from said chamber, means for sealing said first piston relative to said cylinder and sealing said second piston relative to said first piston, a valve means in fluid communication with said inlet, means connecting said valve means to first and second supply tubes respectively, said valve means connecting said inlet to said first and second supply tubes respectively in accordance with a predetermined schedule, and means for moving said first and second pistons respectively in accordance with a predetermined schedule, said valve means connecting said inlet to said first supply tube when said first piston is being moved in a direction out from said chamber and connecting said inlet to said second supply tube when said second piston is being moved in a direction out from said chamber and when either of said pistons is being moved in a direction into said chamber.

10. A metering assembly comprising a cylinder having side walls defining a chamber and having an inlet to said chamber, a first piston movable in directions into and out from said chamber, a second piston movable through said first piston in directions into and out from said chamber, means for sealing said first piston relative to said cylinder and sealing said second piston relative to said first piston, a valve means in fluid communication with said inlet, means connecting said valve means to first and second supply tubes respectively, said valve means connecting said inlet to said first and second supply tubes respectively in accordance with a predetermined schedule, and means for moving said first and second pistons in a direction out from said chamber at different times and then moving said pistons in a direction into said chamber.

11. In the metering assembly of claim 10, actuating means including a control means, said actuating means being operatively connected to said valve means and to said piston moving means, said actuating means being effective (a), when said control means is first actuated in a given sequence, to cause said inlet to be connected to said first supply tube and to cause said first piston to move in a direction out from said chamber, and then stop, (b) when said control means is next actuated in said sequence, to cause said inlet to be connected to said second supply tube and to cause said second piston to move in a direction out from said chamber, (c) said actuating means thereafter causing both of said pistons to move in a direction into said chamber while causing said inlet means to be connected to said second supply tube.

12. In the metering assembly of claim 11, a relief conduit connected to said valve means, said valve means operatively connecting said relief conduit to said inlet when said second supply tube is also connected to said inlet and when one of said pistons is at the same time being moved in a direction into said chamber.

13. In the metering assembly of claim 10, a relief conduit connected to said valve means, said valve means operatively connecting said relief conduit to said inlet when said second supply tube is also connected to said inlet and when one of said pistons is at the same time being moved in a direction into said chamber.

14. A metering assembly comprising a cylinder having side walls defining a chamber and having an inlet to said chamber, a first piston movable in directions into and out from said chamber, a second piston movable through said first piston in directions into and out from said chamber, means for sealing said first piston relative to said cylinder and sealing said second piston relative to said first piston, a valve means in fluid communication with said inlet, means connecting said valve means to first and second supply tubes respectively, said valve means connecting said inlet to said first and second supply tubes respectively in accordance with a predetermined schedule, and means for moving said first and second pistons in a direction out from said chamber at different times and then moving said pistons in a direction into said chamber, said valve means connecting said inlet to said first supply tube when said first piston is being moved in a direction out from said chamber, connecting said inlet to said second supply tube when said second piston is being moved in a direction out from said chamber, and connecting said inlet to said second supply tube when said pistons are being moved in a direction into said chamber.

15. In the metering assembly of claim 14, actuating means including a control means, said actuating means being operatively connected to said valve means and to said piston moving means, said actuating means being effective (a), when said control means is first actuated in a given sequence, to cause said inlet to be connected to said first supply tube and to cause said first piston to move in a direction out from said chamber, and then stop, (b) when said control means is next actuated in said sequence, to cause said inlet to be connected to said second supply tube and to cause said second piston to move in a direction out from said chamber, (c) said actuating means thereafter causing both of said pistons to move in a direction into said chamber while causing said inlet means to be connected to said second supply tube.

16. In the metering assembly of claim 15, a relief conduit connected to said valve means, said valve means operatively connecting said relief conduit to said inlet when said second supply tube is also connected to said inlet and when one of said pistons is at the same time being moved in a direction into said chamber.

17. In the metering assembly of claim 14, a relief conduit connected to said valve means, said valve means operatively connecting said relief conduit to said inlet when said second supply tube is also connected to said inlet and when one of said pistons is at the same time being moved in a direction into said chamber.

18. A metering assembly comprising a chamber having an inlet, means for causing fluid to move into and out from said chamber via said inlet, a valve means in fluid communication with said inlet, means connecting said valve means to first and second supply tubes respectively, and actuating means including a control means operatively connected to said valve means and said fluid moving means, said actuating means being effective (a) when said control means is first actuated in a given sequence, to cause said inlet to be connected to said first supply tube and to cause said fluid moving means to draw a predetermined amount of fluid into said chamber and then stop, (b) when said control means is next actuated in said sequence, to cause said inlet to be connected to said second supply tube and to cause said fluid moving means to draw a second predetermined amount of fluid into said chamber, (c) said actuating means thereafter causing said fluid moving means to eject a predetermined amount of fluid from said chamber and to cause said inlet to be connected to said second supply tube.

19. In the metering assembly of claim 18, a relief conduit connected to said valve means, said valve means connecting said inlet to said relief conduit when said second supply tube is also connected to said inlet and when said fluid moving means is at the same time caused to eject fluid from said chamber.

20. A metering assembly comprising a chamber having an inlet, means for causing fluid to move into and out from said chamber via said inlet, a valve means in fluid communication with said inlet, means connecting said valve means to first and second supply tubes respectively, and actuating means including a control means operatively connected to said valve means and said fluid moving means, said actuating means being effective (a) when said control means is first actuated in a given sequence, to cause said inlet to be connected to said first supply tube and to cause said fluid moving means to draw a predetermined amount of fluid into said chamber and then stop, (b) when said control means is next actuated in said sequence, to cause said inlet to be connected to said second supply tube and to cause said fluid moving means to draw a second predetermined amount of fluid into said chamber, (c) said actuating means thereafter, when said control means is next actuated in said cycle, causing said fluid moving means to eject a predetermined amount of fluid from said chamber while said inlet is caused to be connected to said second supply tube, and thereafter, without further actuation of said control means, carrying out step (a).

21. In the metering assembly of claim 20, a relief conduit connected to said valve means, said valve means connecting said inlet to said relief conduit when said second supply tube is also connected to said inlet and when said fluid moving means is at the same time caused to eject fluid from said chamber.

22. A metering assembly comprising a chamber having an inlet, means for causing fluid to move into and out from said chamber via said inlet, a valve means in fluid communication with said inlet, means connecting said valve means to first and second supply tubes respectively, means for causing said valve means (a) to connect said inlet to a first supply tube when fluid is first caused to move into said chamber, (b) to connect said inlet to said second supply tube when fluid is thereafter caused to move into said chamber, and (c) to connect said inlet to said second supply tube when liquid is thereafter caused to move out from said chamber, a relief conduit connected to said valve means, and means for causing (d) said valve means to connect said inlet to said relief conduit when said second supply tube is also connected to said inlet and when liquid is at the same time caused to move out from said chamber.

23. A metering assembly comprising a pump having an element movable through intake and exhaust stages, a plurality of conduit means, a valve selectively connecting said pump with said conduit means respectively, motive means having a drive member, means operatively connecting said valve and said pump element to said drive member for synchronized drive thereby, switch means operatively connected to said motive means for starting and stopping it, switch actuating means drivingly operatively connected to said drive member, operatively engageable with said switch means at a predetermined point in the cycle of operation of said assembly, and effective to cause said motive means to stop at said predetermined cycle point, and control means operatively connected to said motive means and effective, when operated, to cause said motive means to start.

24. The metering assembly of claim 23, in which said switch actuating means causes said motive means to stop (a) at an intermediate point in the intake stage of said pump and (b) at the end of the intake stage of said pump.

25. The metering assembly of claim 23, in which said assembly operates in two steps, step (a) comprising the exhaust stage of said pump followed by a portion of said intake stage, step (b) comprising the completion of said intake stage, said switch actuating means actuating said switch to stop said motive means at the end of each step.

26. The metering assembly of claim 23, in which said assembly operates in two steps, step (a) comprising the exhaust stage of said pump, said valve means during that stage connecting said pump to one conduit means, followed by a portion of said intake stage, said valve means during that stage portion connecting said pump to the other conduit means, step (b) comprising the completion of said intake stage, said valve means during that stage portion connecting said pump to said one conduit means, said switch actuating means actuating said switch to stop said motive means at the end of each step.

27. A metering assembly comprising a cylinder having walls defining a chamber and having an inlet to said chamber, a first piston movable in directions into and out from said chamber, a second piston movable in directions into and out from said chamber, means for sealing said first piston and said second piston relative to said cylinder, a valve means in fluid communication with said inlet, means connecting said valve means to first and second supply tubes respectively, said valve means connecting said inlet to said first and second supply tubes respectively in accordance with a predetermined schedule, and means for moving said first and second pistons respectively in accordance with a predetermined schedule.

28. The metering assembly of claim 27, in which said first piston is radially spaced from said side walls of said cylinder and said means for sealing said first piston to said cylinder is located at an end of said cylinder and is radially inwardly spaced from said cylinder side walls.

29. In the metering assembly of claim 27, a relief conduit connected to said valve means, said valve means operatively connecting said relief conduit to said inlet when said second supply tube is also connected to said inlet and when one of said pistons is at the same time being moved in a direction into said chamber.

30. A metering assembly comprising a cylinder having walls defining a chamber and having an inlet to said chamber, a first piston movable in directions into and out from said chamber, a second piston movable in directions into and out from said chamber, means for sealing said first piston and said second piston relative to said cylinder, a valve means in fluid communication with said inlet, means connecting said valve means to first and second supply tubes respectively, said valve means connecting said inlet to said first and second supply tubes respectively in accordance with a predetermined schedule, and means for moving said first and second pistons respectively in accordance with a predetermined schedule, said valve means connecting said inlet to said first supply tube when said first piston is being moved in a direction out from said chamber and connecting said inlet to said second supply tube when said second piston is being moved in a direction out from said chamber.

31. The metering assembly of claim 30, in which said first piston is radially spaced from said side walls of said cylinder and said means for sealing said first piston to said cylinder is located at an end of said cylinder and is radially inwardly spaced from said cylinder side walls.

32. In the metering assembly of claim 30, actuating means including a control means, said actuating means being operatively connected to said valve means and to said piston moving means, said actuating means being effective (a) when said control means is first actuated in a given sequence, to cause said inlet to be connected to said first supply tube and to cause said first piston to move in a direction out from said chamber, and then stop, (b) when said control means is next actuated in said sequence, to cause said inlet to be connected to said second supply tube and to cause said second piston to move in a direction out from said chamber, (c) said actuating means thereafter causing both of said pistons to move in a direction into said chamber while causing said inlet means to be connected to said second supply tube.

33. In the metering assembly of claim 32, a relief conduit connected to said valve means, said valve means operatively connecting said relief conduit to said inlet when said second supply tube is also connected to said inlet and when one of said pistons is at the same time being moved in a direction into said chamber.

34. In the metering assembly of claim 30, a relief conduit connected to said valve means, said valve means operatively connecting said relief conduit to said inlet when said second supply tube is also connected to said inlet and when one of said pistons is at the same time being moved in a direction into said chamber.

References Cited

UNITED STATES PATENTS

| | | | |
|---|---|---|---|
| 1,867,601 | 7/1932 | Stokes | 222—318 |
| 2,505,799 | 5/1950 | Smith | 222—135 |
| 3,149,756 | 9/1964 | Carpigiani | 222—137 |

SAMUEL F. COLEMAN, *Primary Examiner.*